US006435036B1

(12) United States Patent
Sakai et al.

(10) Patent No.: US 6,435,036 B1
(45) Date of Patent: Aug. 20, 2002

(54) VORTEX FLOW METER

(75) Inventors: Toshisuke Sakai; Toshihiko Matsuda; Kazuyuki Kasahara; Yasumasa Fukami; Takashi Ehara, all of Fukuoka; Motohiko Matsuguma, Saga; Yasuhiko Ezaki; Masashi Yamaguchi, both of Fukuoka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/904,545

(22) Filed: Jul. 16, 2001

(30) Foreign Application Priority Data

| Jul. 17, 2000 | (JP) | ......................................... 2000-215527 |
| Aug. 29, 2000 | (JP) | ......................................... 2000-258677 |
| Sep. 4, 2000 | (JP) | ......................................... 2000-266825 |
| Sep. 4, 2000 | (JP) | ......................................... 2000-266826 |
| Sep. 12, 2000 | (JP) | ......................................... 2000-276006 |
| Sep. 26, 2000 | (JP) | ......................................... 2000-292054 |

(51) Int. Cl.$^7$ .............................. G01F 1/32; G01F 1/58
(52) U.S. Cl. ................................ 73/861.22; 73/861.12; 73/861.15
(58) Field of Search ........................ 73/861.12, 861.11, 73/861.13, 861.15, 861.16, 861.17, 861.22, 861.25

(56) References Cited

U.S. PATENT DOCUMENTS

| 3,775,673 A | * | 11/1973 | Watanabe | ................. 73/861.22 |
| 4,308,753 A | | 1/1982 | Olson | ....................... 73/861.17 |
| 4,592,240 A | * | 6/1986 | McHale et al. | .......... 73/861.22 |
| 5,866,823 A | | 2/1999 | Scarpa | ..................... 73/861.16 |

FOREIGN PATENT DOCUMENTS

| JP | 60-040914 | 3/1985 |
| JP | 5-172598 | 7/1993 |

* cited by examiner

Primary Examiner—Harshad Patel
(74) Attorney, Agent, or Firm—Wenderoth, Lind & Ponack, L.L.P.

(57) ABSTRACT

A vortex flow meter includes a measuring tube in which a fluid is carried, a vortex generator provided in the measuring tube for developing a Karman vortex in the fluid, a magnetic field generator generating a magnetic field across the measuring tube downstream of the vortex generator, a pair of electromotive force measuring electrodes provided downstream of the vortex generator for measuring an electromotive force generated by the Karman vortex passing across the magnetic field, a pair of reference electrodes provided at locations upstream and downstream of the electromotive force measuring electrodes, respectively, for measuring a potential at each location, and a detector circuit electrically connected to the electromotive force measuring electrodes and the reference electrodes for calculating the flow of the fluid from the electromotive force and the potential measured by the reference electrodes. The flow is calculated by subtracting the potential difference of the reference potential measuring electrodes from the electromotive force measured by the electromotive force measuring electrodes. This allows the flow meter to have an increased measuring range, meet a wide range of flow conditions, have a simple construction, and have measurement accuracy.

22 Claims, 6 Drawing Sheets

VORTEX FLOW METER

FIELD OF THE INVENTION

The present invention relates to a flow meter for measuring the flow of a fluid, such as air or liquid running in a measuring tube, accurately throughout a wide range.

BACKGROUND OF THE INVENTION

Among flow meters for measuring the flow of a fluid which runs in a measuring tube, a Karman-vortex flow meter is known. A conventional Karman-vortex flow meter disclosed in Japanese Patent Laid-open No. 60-40914 develops a Karman vortex in the flow of a fluid, and a generating frequency (referred to as a frequency hereinafter) of the vortex is measured for calculating the rate of the flow. The calculation is based on the fact that the Karman-vortex generating frequency is proportional to the flow. For measuring the Karman-vortex frequency, the meter disclosed in the Japanese Patent Laid-open No. 60-40914 employs an ultrasonic or oscillation technique. It is known that when ultrasonic or oscillating waves directed to a Karman vortex have a frequency or phase change, the change in the ultrasonic or oscillating waves may be measured with only a large, complex, expensive meter even if the measuring tube is relatively small. Because the measuring accuracy of such an expensive meter depends primarily on the generating mechanism of the Karman vortex, the accuracy is easily reduced by a condition such as an ambient temperature or disturbing turbulence which affects the generation of a Karman vortex.

Japanese Patent No. 3113946 discloses that a Karman-vortex frequency is measured with a magnetic field. The modified flow meter will be explained. FIG. 7 is a cross sectional view of a conventional flow meter. The meter includes a measuring tube 1 in which an electrically conductive fluid flows and a vortex generator 2 provided in the measuring tube 1. The vortex generator 2 generates a Karman vortex 3. The meter also includes a pair of electromotive force measuring electrodes 4a and 4b, a detector circuit 5 electrically connected to the electromotive force measuring electrodes 4a and 4b for measuring a voltage between the electrodes 4a and 4b to calculate a flow rate of the fluid running in the measuring tube 1, and a pair of magnetic field generators 7a and 7b mounted around the measuring tube 1. The magnetic field generators 7a and 7b are two magnets mounted to both sides of the measuring tube 1, respectively, so that the two, N and S, poles are opposite to each other. More specifically, the magnetic field generators 7a and 7b are arranged so that the orientation of the magnetic field from the N pole to the S pole is perpendicular to the axis of the vortex generator 2 and to the electromotive force measuring electrodes 4a and 4b. Downstream of the vortex generator 7 in the flow direction, a pair of lines of Karman vortices are generated in which alternate vortices of opposite rotation are developed at a frequency proportional to the representative dimension of the vortex generator 2. The electromotive force measuring electrode 4b is located downstream of the vortex generator 2. The electromotive force measuring electrode 4a opposite to the electromotive force measuring electrode 4b is located downstream of the vortex generator 2 and upstream of the electromotive force measuring electrode 4b. FIG. 7 illustrates the electromotive force measuring electrode 4a arranged unitarily with the vortex generator 2 for simplicity.

The Karman vortex 3 generated by the vortex generator 2 changes the velocity of the flow thus causing a change in the magnetic flux of the magnetic field developed between the magnetic field generators 7a and 7b. The change in the magnetic flux then generates an inductive electromotive force between the electromotive force measuring electrodes 4a and 4b. The number of voltage changes is proportional to the number of vortices and is measured by the detector circuit 5 for calculating the flow.

However, as the electrodes in the conventional Karman-vortex flow meter are directly provided downstream of the vortex generator, they detect vortices in an area where the vortices do not depart completely from the vortex generator and before the vortices grow up to a measurable size. Therefore, the meter receives an influence of fluctuations of the Karman vortices.

Also, as the electrodes are arranged at a point and thus has a small sensing area, the accuracy of measurements may stay low. Particularly, when the electric conductivity is low, a small flow is hardly measured.

The meter is susceptible to disturbing noises and thus requires a scheme for diminishing the affect of noises. Having to include a sophisticated filter circuit makes the overall arrangement of the meter intricate and expensive, thus creating a secondary drawback.

Moreover, when the flow of the fluid is small where Reynolds number is less than 3000 calculated from $Re=UL/v$ (where U is the average flow velocity in the cross section, L is the representative length, and v is the kinetic viscosity coefficient), the velocity distribution significantly varies by the resistance of the inner wall of the measuring tube. This makes Karman vortices generate unstable, thus reducing the accuracy and repeatability of measurements and reducing the accuracy of the calculation of the flow.

SUMMARY OF THE INVENTION

A vortex flow meter follows:

a measuring tube in which a fluid is carried;

a vortex generator provided in the measuring tube for developing a Karman vortex in the fluid;

a magnetic field generator for generating a magnetic field to be applied downstream of the vortex generator across the measuring tube;

a pair of electromotive force measuring electrodes provided downstream of the vortex generator for measuring an electromotive force which is generated when the Karman vortex passes across the magnetic field;

a pair of reference electrodes provided at locations upstream and downstream, respectively, of the electromotive force measuring electrodes for measuring potentials at the locations, respectively; and a detector circuit electrically connected to the electromotive force measuring electrodes and reference electrodes for calculating the flow of the fluid from the electromotive force and the potential measured by the reference electrodes.

The flow meter measures the flow while offsetting a change of the flow caused by a change of the measuring environments and conditions, hence increasing the measurement range, decreasing the cost with no use of extra components for a noise reduction, and improving accuracy of measurement.

DETAILED DESCRIPTION OF THE PREFERRED EMBODIMENTS (Embodiment 1)

Figure 1:
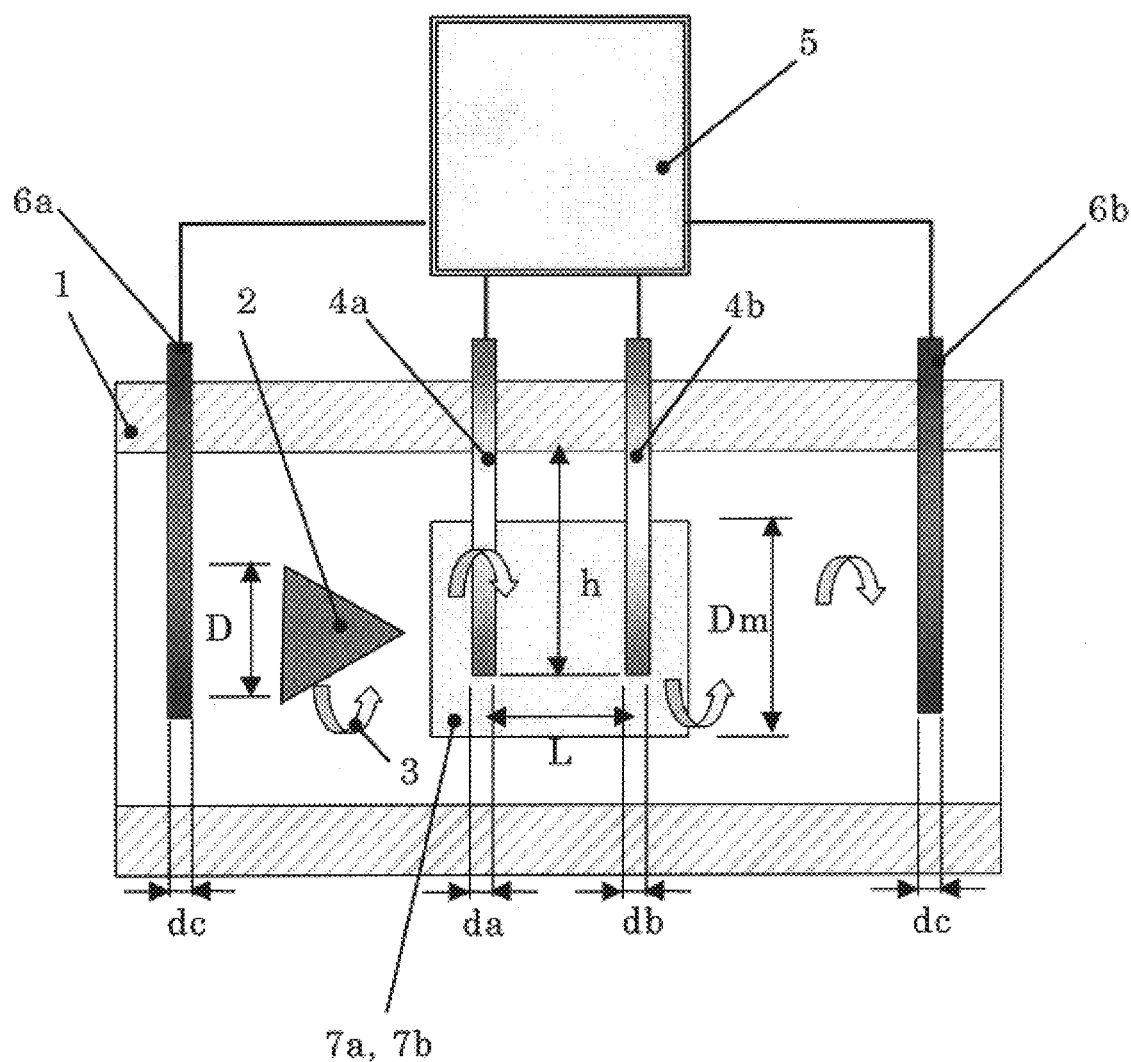
FIG. 1 is a cross sectional view of a flow meter according to Embodiment 1 of the present invention.
Figure 2:
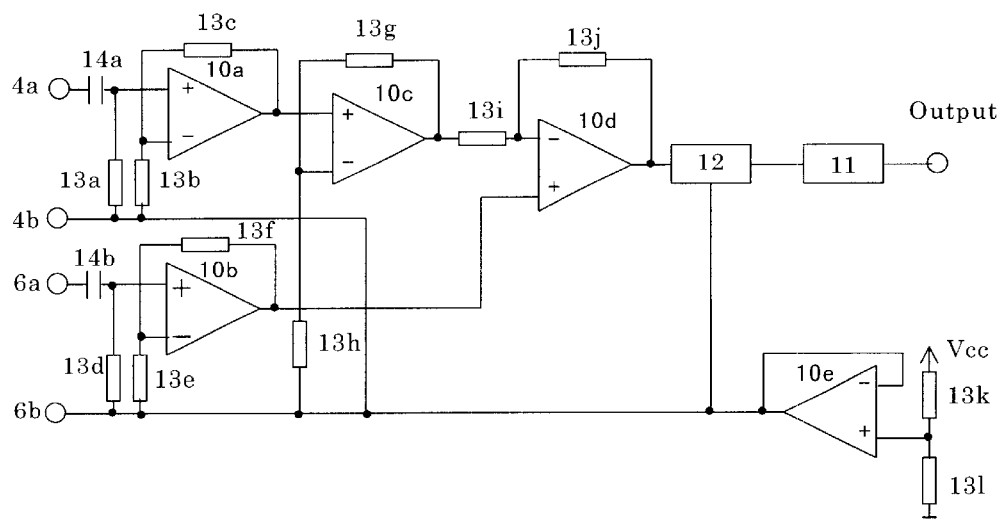
FIG. 2 is a block diagram of a detector circuit in the flow meter of Embodiment 1.

A flow meter according to Embodiment 1 of the present invention will be described referring to FIG. 1 and FIG. 2. Like components are denoted by like numerals as those of the conventional flow meter and will be explained in no more detail. FIG. 1 is a cross sectional view of the flow meter of Embodiment 1, and FIG. 2 is a block diagram of a detector circuit in the flow meter of Embodiment 1.

As shown in FIG. 1, the flow meter includes a measuring tube 1, a vortex generator 2 provided in the measuring tube 1 for developing Karman vortices, a pair of electromotive force measuring electrodes 4a and 4b, a pair of reference electrodes 6a and 6b, a detector circuit 5 for measuring an inducted electromotive force to calculate a rate of the flow and offsetting the influence of disturbing noises, and a pair of magnetic field generators 7a and 7b. A Karman vortex 3 is generated while alternate vortices of opposite rotation are developed at a frequency being proportional to the representative dimension of the vortex generator 2. The small inner diameter of the measuring tube 1 has an inner wall affecting the Karman vortex 3 significantly. Too large of diameter makes the flow velocity slow down and may hardly produce a Karman vortex. At an appropriate flow velocity, the Reynolds number preferably ranges from 3,000 to 100,000. The vortex generator 2 of this embodiment has a triangular column shape, and may have any possible shape that will develop a Karman vortex. The vortex generator 2 of this embodiment is mounted to the inner wall of the measuring tube 1 so that one of the sides of the generator is perpendicular to the direction of the flow. In the flow meter of this embodiment, the measuring tube 1 has an inner diameter of 7 mm for measuring a range of the flow rate from 1 L/min to 10 L/min. Under that condition, it is most desirable that the triangular column body of the vortex generator 2 is an isosceles triangle in the cross section having a width of 2 mm and a height of 3 mm.

The electromotive force measuring electrodes 4a and 4b are arranged in parallel with each other downstream of the vortex generator 2 so that their axes may extend at a right angle to the axis of the vortex generator 2 and the direction of the flow. Each line of flow passes the electromotive force measuring electrode 4a and passes the electromotive force measuring electrode 4b. The magnetic field generators 7a and 7b are permanent magnets mounted on both sides of the measuring tube 1 to sandwich the electromotive force measuring electrodes 4a and 4b with two, N and S, poles facing opposite to each other. When the range of the flow measurement is set from 1 L/min to 10 L/min, the density of magnetic flux in the measuring tube 1 has to be increased by the magnetic field generators 7a and 7b. Therefore, a rare-earth group permanent magnet having a width 1.5 times greater than that of the vortex generator 2 is used as the magnetic field generators 7a and 7b.

The reference electrodes 6a and 6b measure a potential difference between locations upstream and downstream of the electromotive force measuring electrodes 4a and 4b. The reference electrodes 6a and 6b are also arranged in parallel with the electromotive force measuring electrodes 4a and 4b. This allows a flow line passing the reference electrodes 6a and 6b to pass the electromotive force measuring electrodes 4a and 4b. More specifically, the four electrodes are aligned in a row along the direction of the flow from upstream to downstream.

The Karman-vortex flow meter has to be carefully sized for the representative dimension of each component and the Reynolds number of a fluid for steadily developing a Karman vortex 3 and for not generating a noise with a disturbance in the measurement tube 1.

FIG. 1 shows a width D which is the representative dimension of the vortex generator 2, diameters da and db of the electromotive force measuring electrodes 4a and 4b, respectively, a diameter dc of each of the reference electrodes 6a and 6b, a length h of each of the electromotive force measuring electrodes 4a and 4b in the measuring tube 2, a distance L between the electromotive force measuring electrodes 4a and 4b, and a width Dm along the tube diameter of each of the magnetic field generators 7a and 7b. Those dimensions are determined in precise balance so as to steadily develop the Karman vortex 3 but not any disturbing noise, as explained below.

For example, the diameter dc of each of the reference electrodes 6a and 6b is not greater than ½ of the width D of the vortex generator 2. This holds ½ or smaller of the Reynolds number. Accordingly, as laminar flows appear about the reference electrodes 6a and 6b, the Karman vortex 3 is rarely interrupted. Also, the reference electrodes 6a and 6b develop few vortices. Such a change in the flow velocity does not disturb the magnetic flux between the electromotive force measuring electrodes 4a and 4b and does not adversely affect measurement of the flow by reducing the accuracy.

Preferably, the diameters da and db of the respective electromotive force measuring electrodes 4a and 4b may not be greater than ½ the width D of the vortex generator 2 preferably. This holds ½ or smaller of the Reynolds number and can create laminar flows about the electrodes 4a and 4b. As a result, the Karman vortex 3 is hardly disturbed or fractured. The flow disturbed by the electromotive force measuring electrode 4a is spread and runs to the downstream side before reaching the electromotive force measuring electrode 4b. In a case in which the diameters da and db of the electromotive force measuring electrodes 4a and 4b are equal, any noise developed at the electromotive force measuring electrodes 4a and 4b can be minimized. More specifically, the diameters da and db being different from each other may vary the resistance to fluid and the friction between the two electrodes 4a and 4b. Accordingly, the flow is generated irregularly, thus causing noises. The electrodes 4a and 4b having the same diameters minimizes generation of noises. In this embodiment, the diameters da and db being equal to each other allows a substantially uniform noise to be generated. The detector circuit 5 includes a differential amplifier for removing, from the detection signal, a disturbing noise induced on the electromotive force measuring electrodes 4a and 4b and reduces the noise in the signal processing process.

When the length h in the tube of the electromotive force measuring electrodes 4a and 4b is 2 to 2.5 times as large as the width D of the vortex generator 2, the inner diameter of the measuring tube 1 is preferably 3 to 4 times as large as the width D for taking an appropriate balance between the flow and the size. Those dimensions permit the electromotive force measuring electrodes 4a and 4b to sandwich two strings of the Karman vortex 3 at their distant ends with a minimum height and thus measure a change of the electromotive force favorably at the center of the string of the Karman vortex 3, thus mesuring the flow accurately. The detector circuit 5 offsets eddies generated in the wake of the distal ends of the electromotive force measuring electrodes 4a and 4b or disturbing noises developed by turbulence of the flow excluding the Karman vortex 3. Thus, an overall noise is reduced, and the flow measurement can be improved in the accuracy.

In a case in which the distance L between the electromotive force measuring electrodes 4a and 4b is 2 to 2.5 times as large as the width D of the vortex generator 2, the distance L can be smaller than the distance between two strings of the Karman vortex 3. Therefore, as there is one or no vortex passing between the electromotive force measuring electrodes 4a and 4b, the level of noise can be reduced. And thus, one Karman vortex 3 in the string corresponds to one of the detection signal (one pulse), the frequency can be counted very easily, and the flow measurement can further be improved in the accuracy.

In a case in which the width Dm along the tube diameter of the magnetic field generators 7a and 7b is 1.5 to 2 times as large as the width D of the vortex generator, the magnetic field developed in the measuring tube 1 is targeted to the area in the measuring tube 1 where the Karman vortex 3 is developed. Accordingly, a noise generated from undesired eddies developed on the inner wall of the measuring tube 1 can be reduced. In the flow meter of this embodiment, the width Dm is 1.5 times as large as the width D.

In the flow meter sized as described above, when the Karman vortex 3 runs across the magnetic field between the electromotive force measuring electrodes 4a and 4b, the vortex changes the magnetic field and generates pulses of the electromotive force at the electromotive force measuring electrodes 4a and 4b. Simultaneously, the reference electrodes 6a and 6b measure a potential difference around this area, i.e., a reference potential difference between the electromotive force measuring electrodes 4a and 4b. To the potential difference, the measuring conditions (direct current factors and disturbing noises excluding the Karman vortex) are reflected. As a result, the detector circuit 5 offsets the reference potential difference in the electromotive force and thus removes undesired noise or signal components in the detection signal.

The detector circuit and an operation of the circuit in the flow meter of Embodiment 1 will be described in more detail. As shown in FIG. 2, the detector circuit 5 includes operational amplifiers 10a, 10b, 10c, 10d, and 10e, a comparator 11, a band-pass filter 12, resistors, and coupling capacitors.

The operational amplifier 10a has a positive input terminal connected to a coupling capacitor 14a and has a negative input terminal to which an output is fed back via a resistor 13c, thus forming a first positive amplifier. The electromotive force measuring electrode 4a is connected to the positive input terminal via the coupling capacitor 14a, and the electromotive force measuring electrode 4b is connected to the negative input terminal via a resistor 13b which determines an input potential. Similarly, the operational amplifier 10b has a positive input terminal connected to a coupling capacitor 14b and has a negative input terminal to which an output is fed back via a resistor 13f, thus forming a second positive amplifier. The reference electrode 6a is connected to the positive input terminal via the coupling capacitor 14b, and the reference electrode 6b is connected to the negative input terminal via a resistor 13e which determines an input potential. The gain of each of the first and second positive amplifiers is determined by the two resistors connected to the negative input terminal. The electromotive force signals developed on the electromotive force measuring electrodes 4a and 4b and the reference electrodes 6a and 6b is amplified to a desired level by the gain.

The operational amplifier 10c is a buffer amplifier. The operational amplifier 10d operates as a differential amplifier for positive-amplifying an output of the first positive amplifier and for subtracting, from the amplified output, an output of the second positive amplifier. That is, the differential amplifier removes a common-mode signal caused by the disturbing noise from the detection signal and amplifies the detection signal to a desired level easily detected by the comparator 11. An output signal of the operational amplifier 10d passes through the band-pass filter 12 and has the waveform shaped by the comparator 11 before being released out from the detector circuit 5. In brief, the electromotive force signal induced by the Karman vortex 3 passing between the electromotive force measuring electrodes 4a and 4b is subjected to the amplification and the noise elimination of the first and second positive amplifiers and differential amplifier. And then, the electromotive force is shaped to a square wave by the comparator 11 and then released as a string of pulses having a frequency proportional to the rate of the flow. As described previously, one pulse corresponds one Karman vortex 3 and is counted to measure the flow accurately.

(Embodiment 2)

Figure 3:
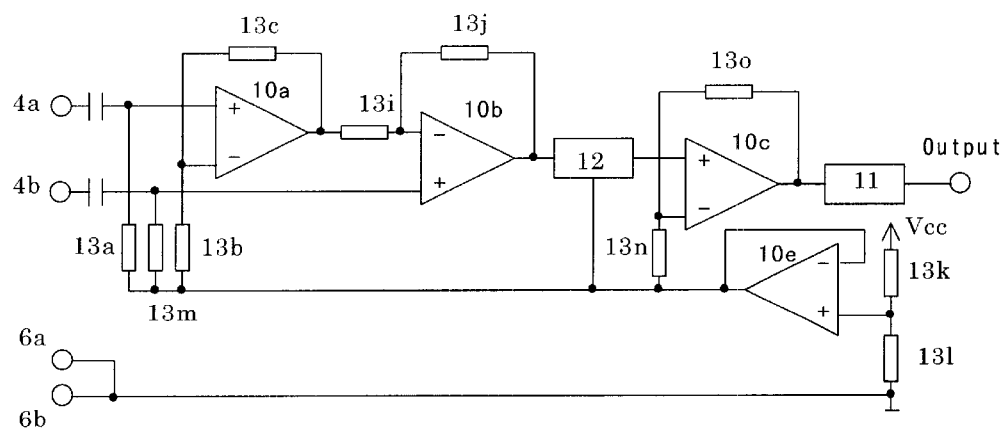
FIG. 3 is a block diagram of a detector circuit in a flow meter according to Embodiment 2 of the present invention.

A flow meter according to Embodiment 2 of the present invention will be described referring to FIG. 3. Like components are denoted by like numerals as those of Embodiment 1 and will be explained in no more detail. FIG. 3 is a block diagram of a detector circuit according to Embodiment 2.

An operational amplifier 10a positive-amplifies a signal received via a coupling capacitor from the electromotive force measuring electrode 4a with a negative feedback. The amplified signal and a signal received from the electromotive force measuring electrode 4b are differentially-amplified by an operational amplifier 10b. The amplifier 10b removes a common-mode signal caused by disturbing noises from the amplified output and amplifies the detection signal to a desired level. The detection signal then passes through a band-pass filter 12 and is amplified by a positive amplifier, which includes mainly an operational amplifier 10c, to a desired level easily detected by a comparator 11. In brief, the electromotive force induced by the Karman vortex 3 passing between the electromotive force measuring electrodes 4a and 4b is amplified by the differential amplifier and the positive amplifiers. The electromotive force has the waveform shaped by the comparator 11 and is released as a string of pulses having a frequency proportional to the rate of the flow.

An operational amplifier 10e operates as a voltage follower circuit. This circuit has an extremely high input impedance and a low output impedance. The reference electrodes 6a and 6b are connected to the grounding side of voltage dividing resistors 13k and 13l loaded with a source voltage Vcc.

Therefore, an electrode potential actually measured between the reference electrodes 6a and 6b is superimposed on a desired partial determined from the source voltage Vcc divided by resistance, and the impendance of the desired potential becomes lower. This allows the output of the operational amplifier 10d (the reference potential applied to the detector circuit 5) to remain constant even if the reference electrode potential actually measured varies. As a result, an influence of external potential fluctuations is eliminated. A noise can be canceled by the differential amplifier including mainly the operational amplifiers 10a and 10b even when the electromotive force developed at the electromotive force measuring electrodes 4a and 4b is small. Consequently, a change in the magnetic field derived from the Karman vortex 3 can favorably be measured.

As described above, the detector circuit 5 of Embodiment 2 eliminates a fluctuation in the actual reference electrode potential with the voltage follower circuit and the reference electrodes 6a and 6b. And the circuit 5 removes the common- mode disturbing noise from the electromotive force received from the coupling capacitor with the differential amplifier circuit, thus detecting the electromotive force induced by a change of the magnetic field caused by the Karman vortex. Accordingly, the flow meter according to this embodiment has a simple construction, is less expensive, and measures the flow accurately.

(Embodiment 3)

Figure 4:
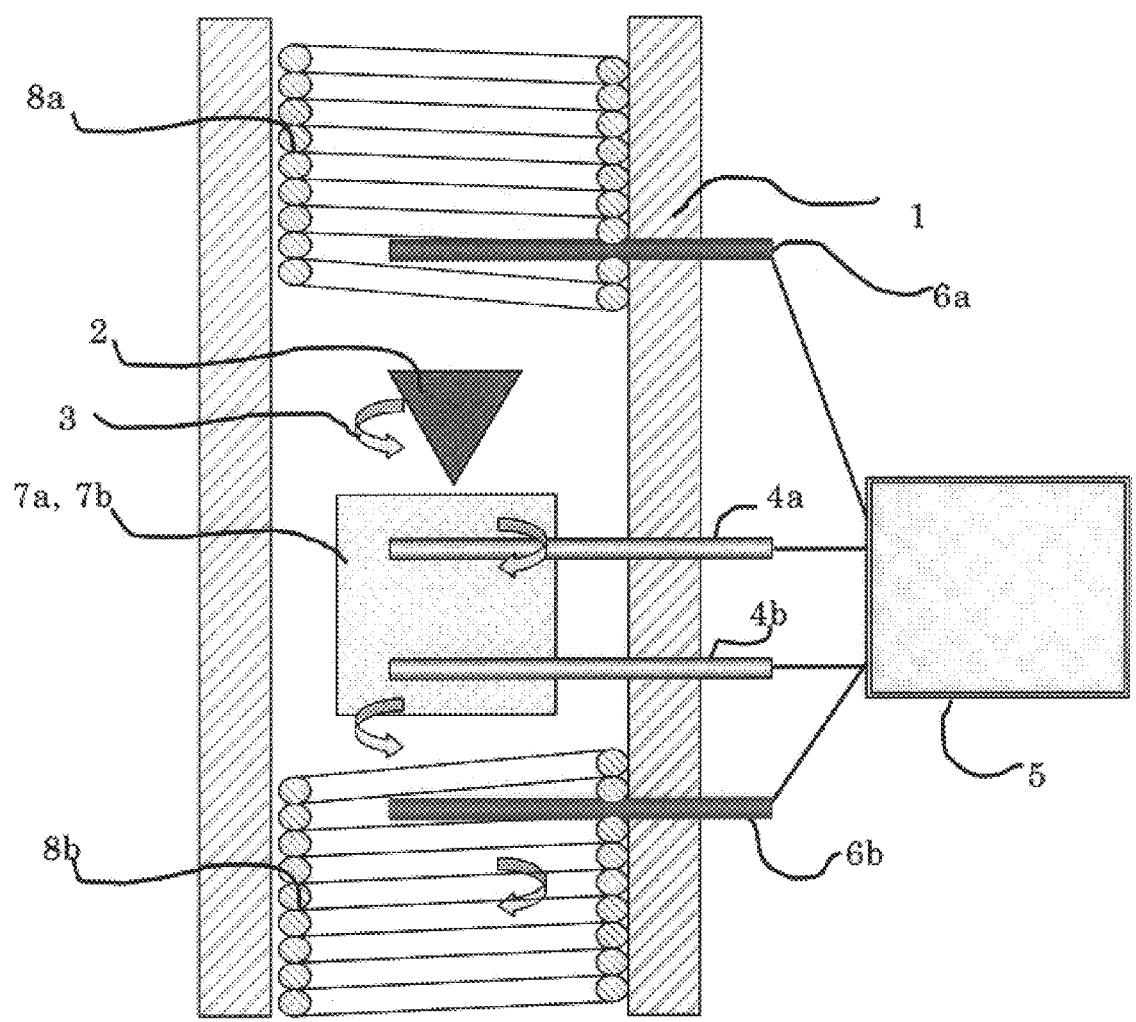
FIG. 4 is a cross sectional view of a flow meter according to Embodiment 3 of the present invention.

A flow meter according to Embodiment 3 of the present invention will be described referring the cross sectional view of FIG. 4. Also, like components are denoted by like numerals as those of Embodiment 1 and will be explained in no more detail.

Undulation members 8a and 8b extending uniformly along the inner wall of the measuring tube 1 are provided. The members are particularly implemented in this embodiment by coil springs which are less expensive.

As described previously, a Karman vortex 3 is steadily developed and has the frequency proportional to the rate of flow when a fluid to be measured is carried in turbulent flows. This condition may be expressed with the Reynolds number. In a proper range of flow velocities, the Reynolds number ranges from 3,000 to 100,000. The Reynolds number may however be varied depending on the shape of the inner wall of the measuring tube 1. Particularly, the Reynolds number ranges from 2,320 to 3,000 at the transition between a laminar flow and a turbulent flow. For measuring a flow in the range of the Reynolds number, the inner wall of the measuring tube 1 has to be roughed uniformly on the surface upstream of the vortex generator 2 in order to develop turbulent flows steadily.

For that reason, Embodiment 3 employs the two coil springs 8a and 8b provided upstream and downstream of the vortex generator 2 along the inner wall of the measuring tube 1, respectively. The coil springs 8a and 8b, as each having a uniform pitch, are most favorable materials for implementing uniform undulation over the inner wall. Also, the coil springs 8a and 8b are easily assembled and has the effect precisely predicted. The coil springs 8a and 8b prevent the measuring tube 1 from being delicately machined in the inner wall, hence contributing to the easy fabrication of the flow meter with the measuring tube 1 undulated on the inner wall without costly processes.

The coil springs 8a and 8b are made of electrically conductive material and directly connected with the reference electrodes 6a and 6b, respectively. The reference electrodes 6a and 6b, which are directly connected with the coil springs 8a and 8b, have the performance for measuring the reference potential improved. Upon having the pitch between two adjacent windings partially greater than the diameter of the reference electrodes 6a and 6b, the coil springs 8a and 8b hold the reference electrode 6a and 6b securely and tight with a yielding force, respectively. The coil springs 8a and 8b, when formed of close-coiled helical type springs, have increased areas contacting with the fluid thus improving the effectiveness. For inhibiting the reference electrodes 6a and 6b from being deformed by the yielding force of the coil springs 8a and 8b, the coil springs 8a and 8b have to be made from the same material and to have the same diameter as the reference electrodes 6a and 6b.

An operation of the flow meter according to Embodiment 3 will be explained. A fluid to be measured running in the measuring tube 1 is disturbed by the coil spring 8a to cause a turbulent flow. Accordingly, a Karman vortex 3 is developed with the vortex generator 2 as proportional to the velocity of the flow. As the Karman vortex 3 crosses the magnetic field between the electromotive force measuring electrodes 4a and 4b, the vortex creates regularly a string of pulses of electromotive force. Simultaneously, a potential difference between the electromotive force measuring electrodes 4a and 4b to which the other factors (a direct current and disturbing noises other than the Karman vortex) is reflected is measured with the reference electrodes 6a and 6b. As a result, an undesired noise or signal component in the detection signal can readily be removed by the detector circuit 5 offsetting the component in the reference potential signal.

The flow meter according to Embodiment 3 has the coil springs 8a and 8b provided for implementing uniform undulation over the inner wall of the measuring tube 1, allowing a Karman vortex 3 to be developed steadily. This can extend the measuring range and improve the resistance to noises. Upon having the uniform undulation implemented by separate members, the measuring tube 1 can be less expensive.

(Embodiment 4)

Figure 5:
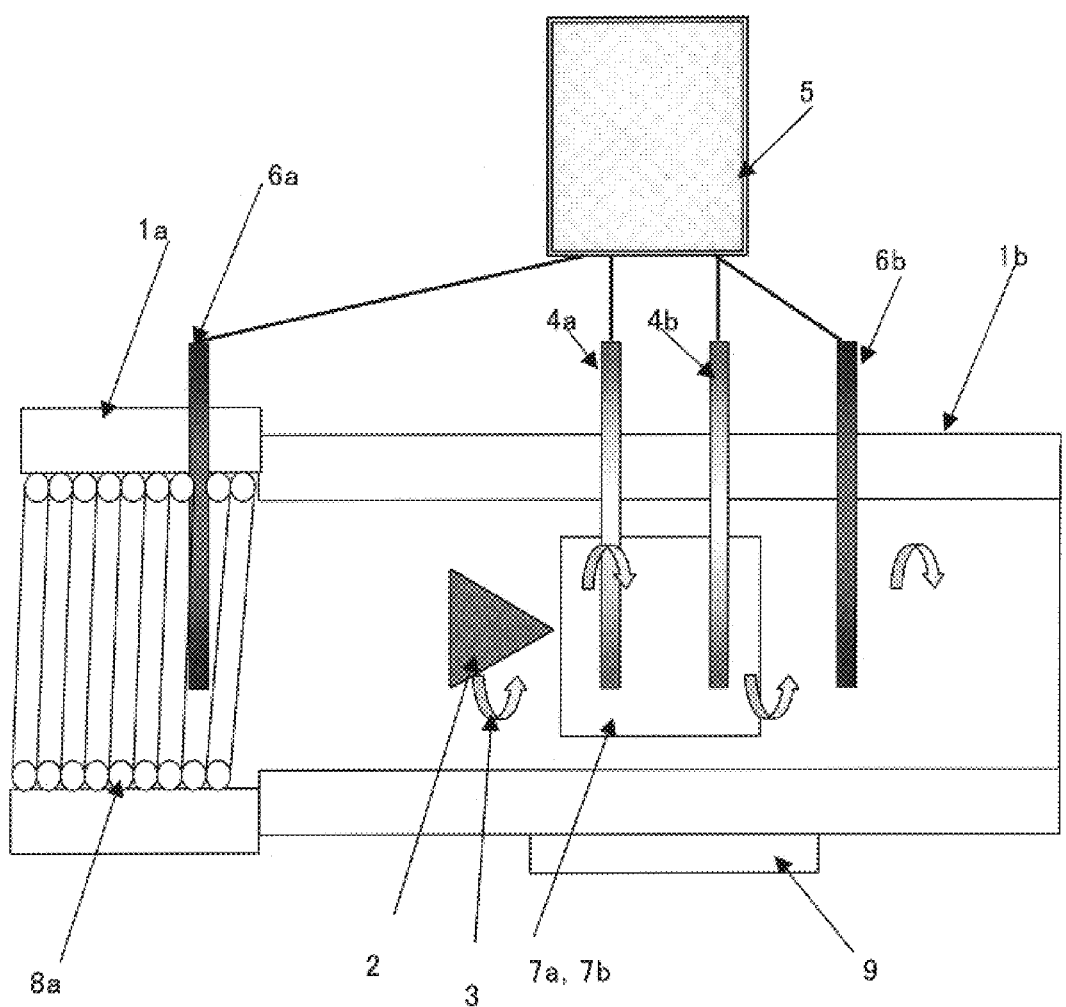
FIG. 5 is a cross sectional view of an arrangement with a flow meter according to Embodiment 4 of the present invention.
Figure 6A:
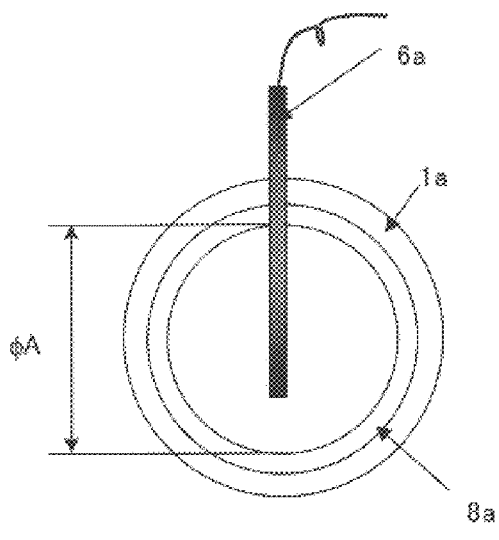
FIG. 6A is a cross sectional view of a flow input section of the flow meter of Embodiment 4.

A flow meter according to Embodiment 4 of the present invention will be described referring to FIGS. 5 and 6. Like components are denoted by like numerals as those of Embodiment 1 and will be explained in no more detail. FIG. 5 is a cross sectional view of an arrangement of the flowmeter of Embodiment 4. FIG. 6A is a cross sectional view of a flow input section of the flow meter and FIG. 6B is a cross sectional view of the flow meter of Embodiment 4.

As shown in FIG. 5, the flow meter has a metal yoke 9 for reducing a leakage of magnetic fluxes generated by magnetic field generators 7a and 7b.

Figure 6B:
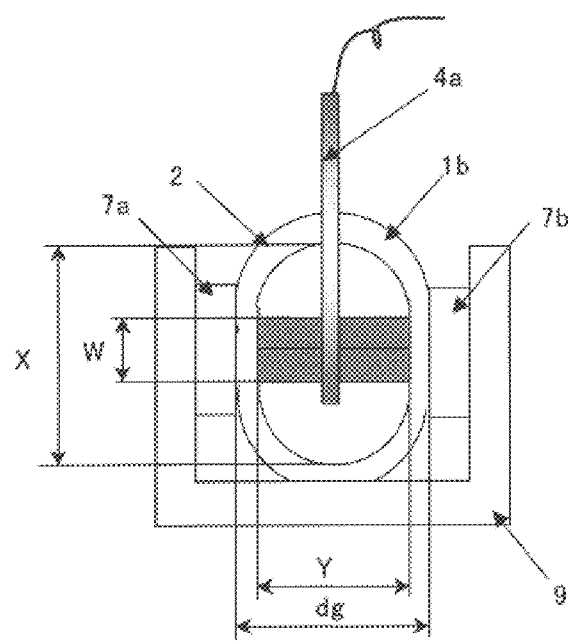
FIG. 6B is a cross sectional view of the flow meter of Embodiment 4.
Figure 7:
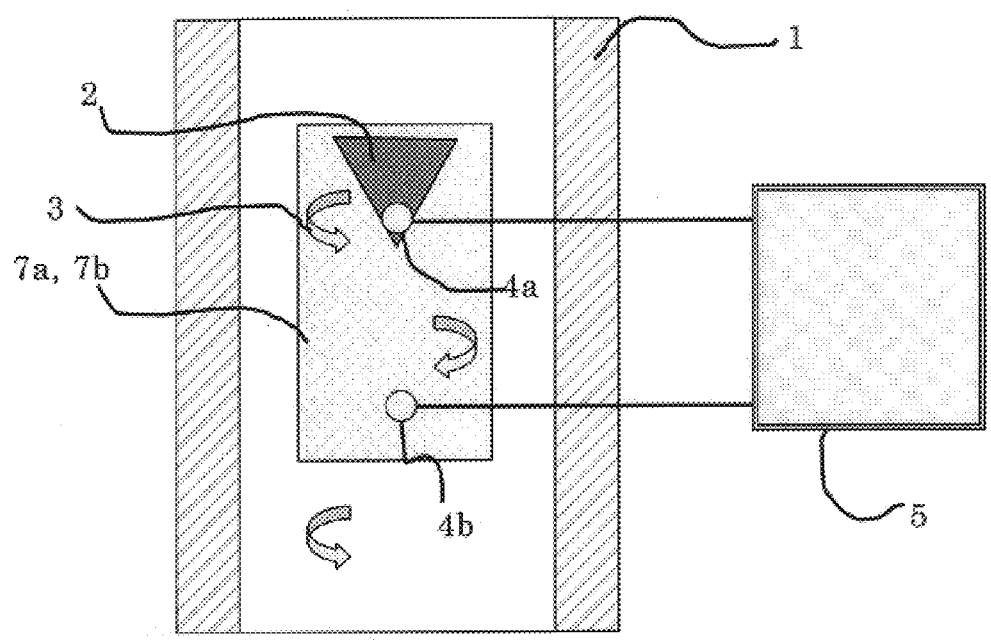
FIG. 7 is a cross sectional view of a conventional flow meter.

As shown in FIG. 6B, the cross section of a measuring tube 1b of Embodiment 4 consists of a track shape having an arcuate portion. The shape has linear portions orthogonal to the magnetic field generated by the magnetic field generators 7a and 7b and arcuate portions bridging over the linear portions. This permits the distance dg between the magnetic field generators 7a and 7b to be minimized without disturbing a Karman vortex 3 generated by a vortex generator 2. The arcuate portions are curved outward and symmetrical about a direction perpendicular to the magnetic field. The symmetry about the direction perpendicular to the magnetic field is equivalent to the symmetry about a line extending between and in parallel with the linear portions. The arcuate portions are also symmetrical about the magnetic field in Embodiment 4. For reducing the distance dg in the cross section of the measuring tube 1b, the distance X between the inner sides of arcuate portions (referred to as an arcuate distance) is not smaller than the length Y between the linear portions (referred to as a linear distance). More particularly, the arcuate distance X is a long axis length of the track shape while the linear distance Y is a short axis length.

The arcuate portion may preferably have a semi-circular shape of which the diameter is equal to the linear distance Y. This allows the measuring tube 1b to be fabricated more easily and less expensively. The measuring tube having this shape is smoothly joined with the linear edges in the direction of a tangent, thus rarely producing secondary eddies which disturb the measurement and can have an increased measuring range and improved measuring accuracy.

The smaller the arcuate distance X, the higher the velocity of the flow will increase to provide a higher Reynolds number, hence making the measurement easy. If the arcuate distance X is too small, the inner wall surface disturbs the flow and prevents a Karman vortex 3 from being generated. Therefore, the arcuate distance X and the width W of the vortex generator 2 preferably have the ratio of W/X ranging 0.2 to 0.4. The measuring tube 1b of Embodiment 4, for having a measuring range from 1 L/min to 10 L/min, has the linear distance of 3.8 mm, the diameter of the arcuate portion of 3.8 mm, and the arcuate distance of 6.8 mm. The vortex generator 2 in the measuring tube 1b may preferably be a triangular column having an isosceles triangle in the cross section, a width of 2 mm, and a height of 3 mm.

The magnetic field generators 7a and 7b are accompanied with a metal yoke 9 and spaced by a small distance dg from each other for reducing the leakage and thus increasing the magnetic flux. In case that the measuring tube 1b of this embodiment has the linear distance of 3.8 mm, the diameter of the arcuate portion of 3.8 mm, and the arcuate distance of 6.8 mm for having a measuring range from 1 L/min to 10 L/min, the magnetic field generators 7a and 7b may be implemented by a ferrite magnet. More preferably, the magnetic material is a rare-earth permanent magnet, such as neodymium (Ne), samarium (Sm), or cerium (Ce), which has a higher magnetic flux density and a favorable thermal property for further improving the accuracy of measurement.

What is claimed is:

1. A vortex flow meter comprising:
   a measuring tube in which a fluid is carried;
   a vortex generator provided in the measuring tube for developing a Karman vortex in the fluid;
   a magnetic field generator for generating a magnetic field applied downstream of the vortex generator across the measuring tube;
   a pair of electromotive force measuring electrodes provided downstream of the vortex generator for measuring an electromotive force generated when the Karman vortex passes across the magnetic field;
   a first reference electrode provided upstream of said vortex generator and a second reference electrode provided downstream of the electromotive force measuring electrodes, for measuring a potential at each location; and
   a detector circuit electrically connected to the electromotive force measuring electrodes and the first and second reference electrodes for calculating a flow of the fluid from the electromotive force and the potential measured by the first and second reference electrodes.

2. The vortex flow meter according to claim 1, wherein the detector circuit comprises a differential amplifier for eliminating common-mode disturbing noise components induced at the electromotive force measuring electrodes and the signal between the paired first and second reference electrodes.

3. The vortex flow meter according to claim 2, wherein the detector circuit further comprises:
   a first positive amplifier for amplifying the electromotive force generated between the electromotive force measuring electrodes and inputting the amplified electromotive force to a first input of the differential amplifier; and
   a second positive amplifier for amplifying the electromotive force generated between the first and second reference electrodes and inputting the amplified electromotive force to a second input of the differential amplifier.

4. The vortex flow meter according to claim 1, wherein the detector circuit further comprises:
   a coupling capacitor for coupling the electromotive force measuring electrodes to the differential amplifier; and
   a voltage follower circuit for generating a reference potential from the potential measured at the first and second reference electrodes.

5. The vortex flow meter according to claim 4, wherein the voltage follower circuit generates the reference potential in which the potential measured by the first and second reference electrodes is superimposed with a certain potential.

6. The vortex flow meter according to claim 4, wherein the detector circuit further comprises a high impedance circuit for determining the reference potential.

7. The vortex flow meter according to claim 1, wherein the detector circuit further comprises an amplifier for amplifying an output of the differential amplifier.

8. The vortex flow meter according to claim 1, wherein each of the first and second reference electrodes has a diameter not greater than ½ of a width of the vortex generator.

9. The vortex flow meter according to claim 1, wherein each of the first and second reference electrodes has the same shapes.

10. The vortex flow meter according to claim 1, wherein each of the electromotive force measuring electrodes has a diameter not greater than ½ of a width of the vortex generator.

11. The vortex flow meter according to claim 1, wherein the electromotive force measuring electrodes have the same diameters.

12. The vortex flow meter according to claim 1, wherein each of the electromotive force measuring electrodes has, in the measuring tube, a length ranging 2 to 2.5 times as large as a width of the vortex generator.

13. The vortex flow meter according to claim 1, wherein the electromotive force measuring electrodes have the same length in the measuring tube.

14. The vortex flow meter according to claim 1, wherein a distance between the electromotive force measuring electrodes is 2 to 2.5 times as large as a width of the vortex generator.

15. The vortex flow meter according to claim 1, wherein a width between the magnetic field generators in a radial direction of the measuring tube is 1.5 to 2 times as large as a width of the vortex generator.

16. The vortex flow meter according to claim 1, wherein the measuring tube has an undulated portion over an inner wall surface thereof.

17. The vortex flow meter according to claim 16, further comprising a separate undulated member provided on an inner wall of the measuring tube.

18. The vortex flow meter according to claim 17, wherein the separate undulated member is electrically conductive and contacts directly with a portion of one of the first and second reference electrodes.

19. The vortex flow meter according to claim 17, wherein the separate undulated member is a coil spring.

20. The vortex flow meter according to claim 19, wherein the coil spring has a portion having a pitch not greater than a diameter of the reference electrodes, the portion accepting one of the first and second reference electrodes.

21. The vortex flow meter according to claim 1, wherein a cross section of the measuring tube has a track shape having linear portions orthogonal to the magnetic field and arcuate portions bridging over the linear portions, the arcuate portions arranged symmetrical about a direction orthogonal to the magnetic field, a distance between the arcuate portions being greater than a width between the linear portions.

22. The vortex flow meter according to claim 21, wherein each of the arcuate portions has a semi-circular shape.

* * * * *